Oct. 9, 1962 J. J. HAGOPIAN 3,058,100

MAGNETIC RECORDING AND REPRODUCING SYSTEM

Filed April 16, 1958 2 Sheets-Sheet 1

INVENTOR.
JACOB J. HAGOPIAN

BY Richard E. Cummins

ATTORNEY

Oct. 9, 1962 J. J. HAGOPIAN 3,058,100

MAGNETIC RECORDING AND REPRODUCING SYSTEM

Filed April 16, 1958

2 Sheets-Sheet 2

3,058,100
MAGNETIC RECORDING AND REPRODUCING SYSTEM

Jacob J. Hagopian, Santa Clara County, Calif., assignor to International Business Machines Corporation, New York, N.Y., a corporation of New York Filed Apr. 16, 1958, Ser. No. 728,878
3 Claims. (Cl. 340—174.1)

This invention relates in general to magnetic recording systems employing a plurality of transducers and in particular to an improved system for selecting a particular one of the transducers to perform a recording or reproducing operation.

In storing information in the form of magnetized areas on a movable record member having a plurality of closely spaced recording tracks, it is sometimes advantageous to employ a plurality of magnetic transducers each permanently associated with a different track rather than to employ a single transducer which is selectively positioned from one track to another. The main advantage of employing a plurality of permanently assigned transducers is that no positioning mechanism is required in the storage device for selecting a particular record. A second advantage is that access time to any selected record is greatly reduced since it is only necessary to switch electronically from one transducer to another, the maximum access time being determined only by the time required for a unit record to pass completely under its associated transducer.

The prior art has shown that the selection of a particular transducer or the switching from one transducer to another may be greatly simplified by employing gated type transducers arranged electrically in a matrix configuration. With such an arrangement, recording is achieved by energizing the "$x$" input line of the matrix associated with the selected transducer with write signals and the "$y$" input lines not associated with the selected transducer with control signals to prevent the flux caused by the write signals from flowing in the magnetic circuits of the unselected transducers associated with the "$x$" input line of the selected transducer. A reproducing or reading operation is achieved in a similar manner. One disadvantage with recording or reproducing systems of the type represented by the above mentioned prior art is that it is not always possible to block the write signal completely from the unselected transducers during a writing operation and hence the records of unselected transducers may be adversely affected.

It was found that this problem could be overcome by a gated transducer having a control winding and a write winding arranged with regard to a closed magnetic circuit in the core of the transducer so that a writing flux is forced from the core only when both windings are energized simultaneously in a manner to cause the flow of fluxes around the closed magnetic circuit to be in opposition. A recording and reproducing system employing a plurality of transducers of this type arranged in a matrix configuration is disclosed and claimed in my copending application Serial No. 660,974, now Pat. No. 2,933,721, granted April 19, 1960. In that system the control windings are energized from one dimension of the matrix and the write windings from the other dimension, a particular transducer being selected for writing by energizing the appropriate "$x$" and "$y$" matrix lines with current to cause a writing flux to be forced from the core of the selected transducer. The nonselected transducers are not affected during the writing operation since only one winding, at the most, of each nonselected transducer is energized. Likewise, a transducer is selected to perform a reproducing or reading operation by causing a flow of flux in only one direction around the closed magnetic circuit in each of the nonselected transducers, thereby preventing their respective sensing windings from being influenced by the associated nonselected records. While the sensing windings of all the transducers are in series, only the signal produced by the sensing winding of the selected transducer is supplied to the read-out tap.

Such an arrangement is quite satisfactory in situations where a relatively large number of transducers are not required. However, if the number of transducers in the matrix is increased, it will be seen that the read signal of the selected transducer may be affected even if the sensing winding of each nonselected transducer provides only a negligible signal, since these signals have a cumulative effect. It is, of course, theoretically possible to prevent the sensing windings of the nonselected transducers from contributing to the output signal, but from a practical standpoint it will be realized that this is not always possible and that each sensing winding will produce a small incremental signal.

It has been found in accordance with the present invention that the effect of these small incremental signals on the read signal of the selected transducer may be greatly reduced by dividing the sensing winding on each transducer into two sections and arranging the sections of all the sensing windings in the form of a two-dimensional matrix, the lines of which are connected to a read-out tap through a plurality of saturable transformers. The sections of the sensing windings in each line of the matrix are connected to the primary winding of the associated saturable transformer, the secondary windings of the transformers being connected in series to the read-out tap. Means in the form of a control winding on the saturable transformer operates when energized to decouple the primary winding of the transformer from the secondary. By energizing all the control windings on the saturable transformers except those two which are associated with the lines corresponding to the selected transducer, the incremental signals of substantially all of the nonselected transducers are prevented from affecting the read-out signal of the selected transducer.

It is therefore an object of the present invention to provide an improved recording and reproducing system.

Another object of the present invention is to provide in a recording and reproducing system employing a plurality of magnetic transducers an improved arrangement for selecting a particular transducer.

A further object of the present invention is to provide in a matrix of gated transducers an improved arrangement for reducing the effect of spurious signals generated by the sensing windings of nonselected transducers on the read signal of a selected transducer.

Other objects of the invention will be pointed out in the following description and claims and illustrated in the accompanying drawings, which disclose, by way of example, the principle of the invention and the best mode which has been contemplated of applying that principle.

Figure 1:
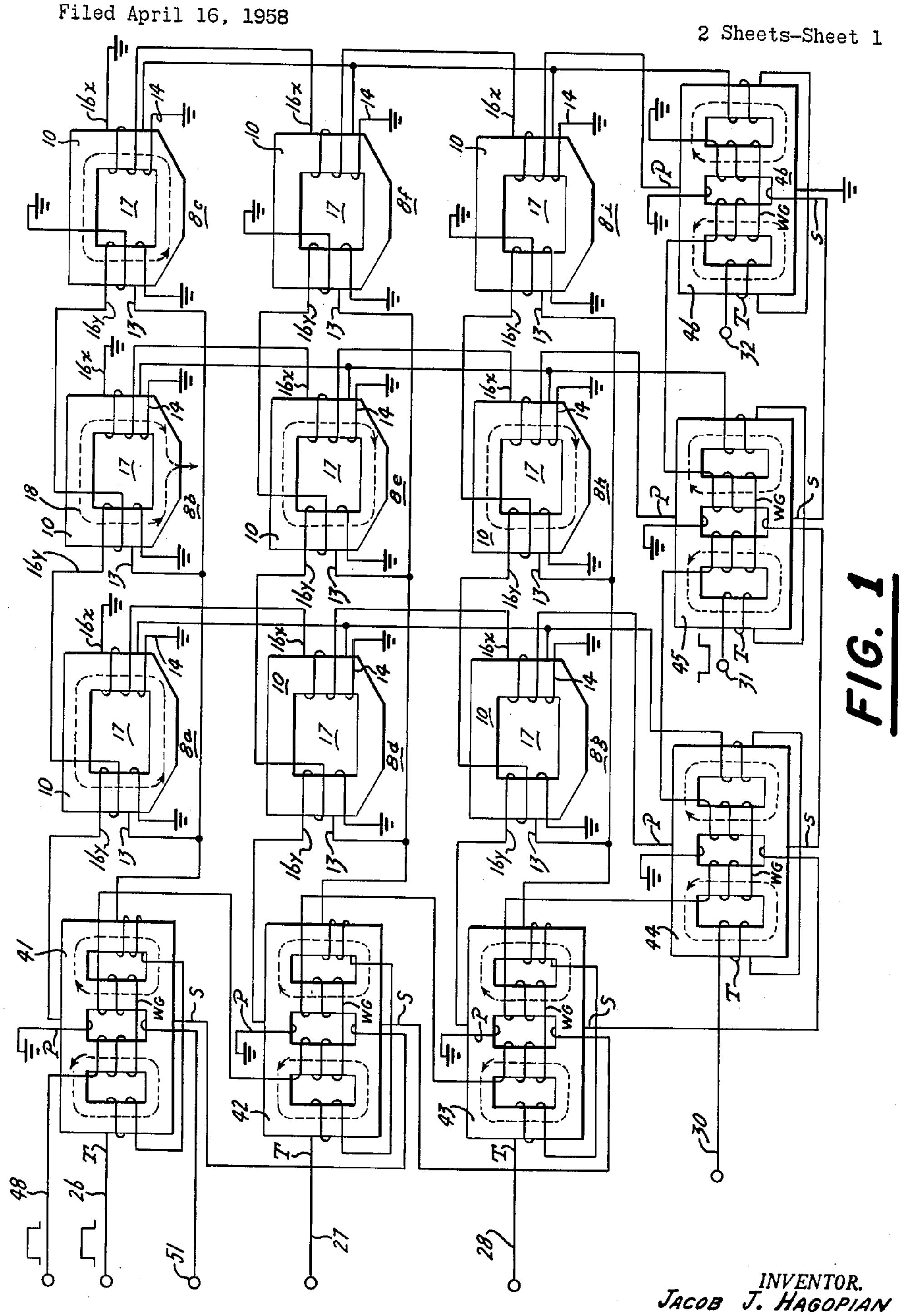
FIG. 1 is a schematic view of an embodiment of the invention illustrating a recording operation.

Referring to the drawings and particularly to FIG. 1, the system illustrated therein comprises generally a plurality of transducers 8a through 8i each of which is similar in construction and operation to the transducer shown in the above mentioned copending application. Each transducer 8, as shown, comprises a perpendicular type recording probe 10 which is adapted to be positioned in flux-engaging relationship with a magnetic record (not shown). One end of the probe is provided with a window 17 which creates a closed magnetic circuit 18 in the frame portion of the probe defining the window. Write winding means comprising a control winding 13 and a write winding 14 are positioned on the sides of the frame to cause flux to flow around the closed magnetic circuit 18 in predetermined directions depending on whether a write operation or a blocking operation is desired. The transducers 8 are each further provided with sensing winding means 16 comprising winding sections 16*x* and 16*y* in which signals are generated during a read operation in response to the passage of the magnetic record under the end of the probe.

The control windings 13 are energized from the "*y*" input lines 26, 27 and 28 of the matrix through windings T on the saturable transformers 41, 42 and 43 associated with each line of the "*y*" dimension of the matrix, while the write windings 14 are energized from the "*x*" input lines 30, 31 and 32 of the matrix through similar windings T on the saturable transformers 44, 45 and 46 associated with each line of the "*x*" input dimension of the matrix. A recording operation is performed by one of the transducers by simultaneously applying a write signal to an "*x*" input line to energize write winding 14 and a control signal to a "*y*" input line to energize an associated control winding 13 so that their respective fluxes flow around the closed magnetic circuit 18 in the probe of the selected transducer in opposite directions, resulting in flux being forced from the distal end of the probe. If, for example, it is desired to select transducer 8*b* to perform a writing operation, control winding 13*b* and write winding 14*b* are energized by applying write signals to lines 26 and 31, respectively. In order to allow these write signals to pass through the T windings of the saturable transformers 41 and 45 without being attenuated, each saturable transformer is provided with a write gate winding WG. The write gate windings of all the transformers are connected in series to a write gate tap 48. The application of a write gate signal to tap 48 energizes each of the write gate windings, resulting in the repsective transformer cores being saturated. Signals applied to the "*x*" and "*y*" input lines 26 and 31 of the matrix, therefore, pass to the write winding means of the selected transducer 8*b* unimpeded.

The operation of the present system in performing a writing operation is identical to the write operation of the system disclosed in the above mentioned copending application except for the addition of the write gate signal. The advantages of that system are therefore maintained in the present arrangement. Additional advantages are obtained with the present invention in a reproducing or reading operation since the read signal of the selected transducer is unaffected by the signals of substantially all of the nonselected transducers.

The sections 16*x* of the sensing winding means 16 are connected in predetermined groups to the primary windings P of the transformers 44 through 46 associated with the "*x*" input lines of the matrix while the sections 16*y* of the sensing winding means 16 are connected in predetermined groups to the primary windings P of the transformers 41 through 43 associated with the "*y*" input lines of the matrix. A particular transducer is selected to perform a reproducing or reading operation by rendering the sensing winding means 16 of the other transducers substantially non-responsive to their respective records by energizing either control winding 13 or write winding 14 singly to cause flux to flow around the closed magnetic circuit 18 in each core in either direction or by energizing both windings jointly so that their respective fluxes are in an additive relationship. This condition may be referred to as a blocking condition.

Figure 2:
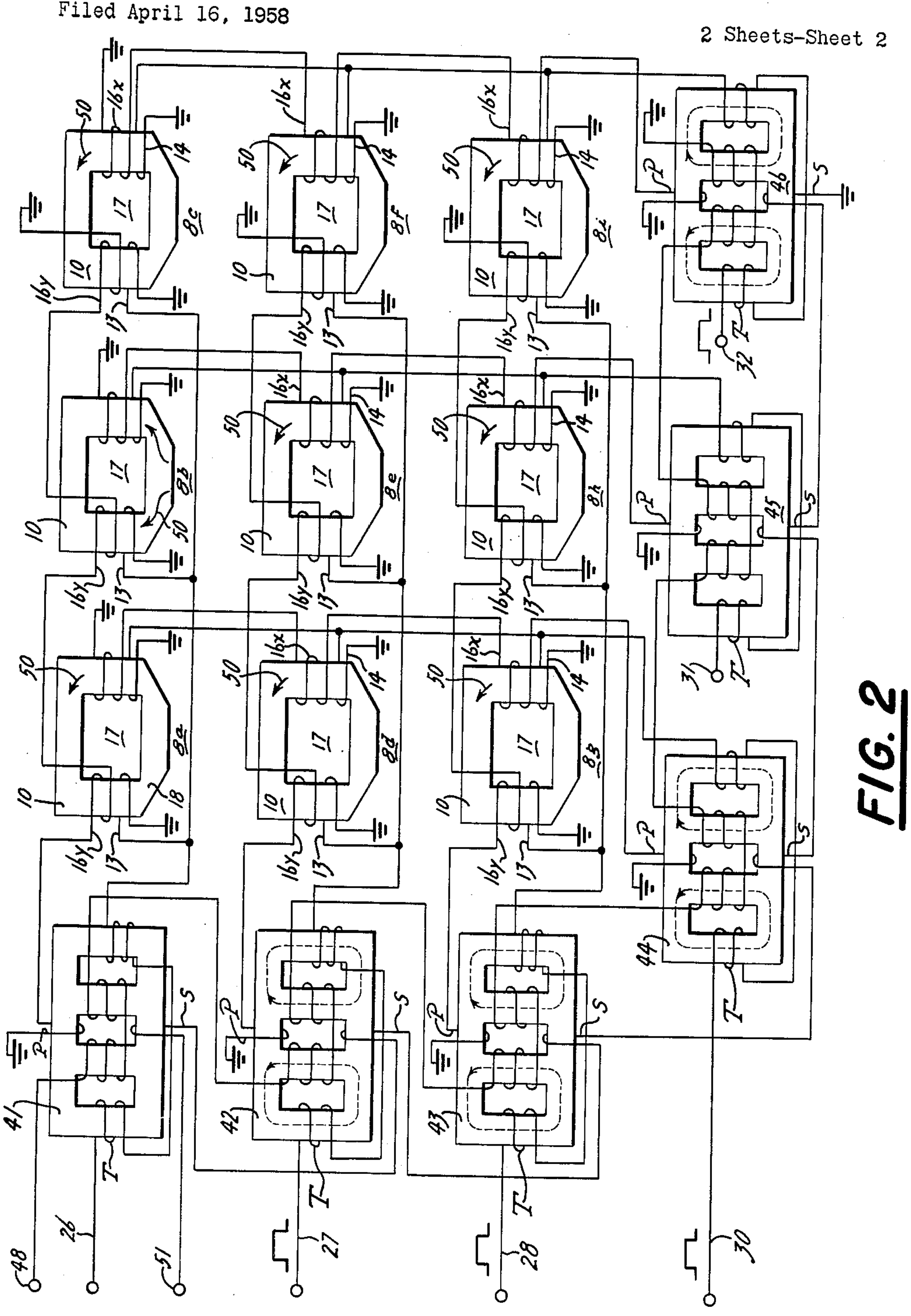
FIG. 2 is a schematic view of the invention shown in FIG. 1 illustrating a reproducing operation.

For example, in FIG. 2 transducer 8*b* has been selected to perform a read operation, blocking signals being supplied to "*y*" input lines 27 and 28 and "*x*" input lines 30 and 32, which results in the flow of fluxes in the cores of the nonselected transducers in the directions indicated by the arrows 50. The blocking signals are applied to the respective control and write windings of the transducers through the saturating windings T of the saturable transformers 42, 43, 44 and 46. The cores of these transformers are therefore saturated, which decouples the primary windings P from the secondary windings S. Saturating windings T may therefore be referred to as means responsive to the energization of the input lines of the matrix for decoupling the primary and secondary windings of the associated saturable transformer. It will be seen that any small incremental signals generated by the sections 16*x* associated with "*x*" input lines 30 and 32 and any signals generated by sections 16*y* associated with "*y*" input lines 27 and 28 are prevented from affecting the read-out signal of the selected transducer 8*b*. Only signals generated by sections 16*y* of transducers 8*a* and 8*c* and section 16*x* of transducers 8*e* and 8*h* are capable of interfering with the read signal of transducer 8*b*. The read signals from sections 16*x* and 16*y* of transducer 8*b*, applied to the primary windings P of the transformers 41 and 45 which have not been saturated, provide corresponding signals through their associated secondary windings S, resulting in the read signal to read-out tap 51. It will be seen that with the present invention only four winding sections 16 out of a possible sixteen sections are capable of providing spurious signals which may interfere with the signal from the selected transducer. This advantage becomes geater as the size of the matrix increases. For example, in a 10 x 10 matrix only eighteen winding sections 16 out of a possible 198 would be capable of providing spurious signals to read-out tap 51. A considerable reduction in noise signals is therefore obtained with the present invention.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a recording and reproducing system having a plurality of gated type magnetic transducers each of which includes first and second windings adapted to be selectively and directionally energized from a two-dimensional matrix and sensing winding means operable to provide a read signal when said first and second windings are deenergized, means for selecting a particular transducer to provide a read signal and to prevent a majority of the nonselected transducers from providing spurious signals comprising a plurality of inductive devices each including a primary winding, a secondary winding, means coupling said secondary winding to said primary winding, and a saturating winding magnetically linking said primary winding and said secondary winding so as to render said coupling means ineffective when said saturating winding is energized, means connecting each said primary winding to a different group of said sensing windings, means connecting said secondary windings in series, and means for energizing each said saturating winding in response to an associated input line of said matrix being energized to cause at least one of said first and second windings of each nonselected transducer to be energized, and to cause said first and second windings of the selected transducer to be deenergized and to cause said saturating windings connected to said selected input lines to be energized, whereby spurious signals of the sensing windings of a majority of the nonselected transducers are prevented from affecting the read signal supplied to the series-connected secondary windings from the sensing winding of the selected transducer.

2. The invention recited in claim 1 in which said saturating winding energizing means comprises means connecting each of said saturating windings in series with the said associated input line.

3. The invention recited in claim 2 in which each of said transformers comprises a write gate winding operable when energized to prevent an associated saturating winding from attenuating a write signal supplied to the associated input line.

References Cited in the file of this patent

UNITED STATES PATENTS

| | | |
|---|---|---|
| 2,709,248 | Rosenberg | May 24, 1955 |
| 2,719,773 | Karnaugh | Oct. 4, 1955 |